United States Patent Office 3,479,807
Patented Nov. 25, 1969

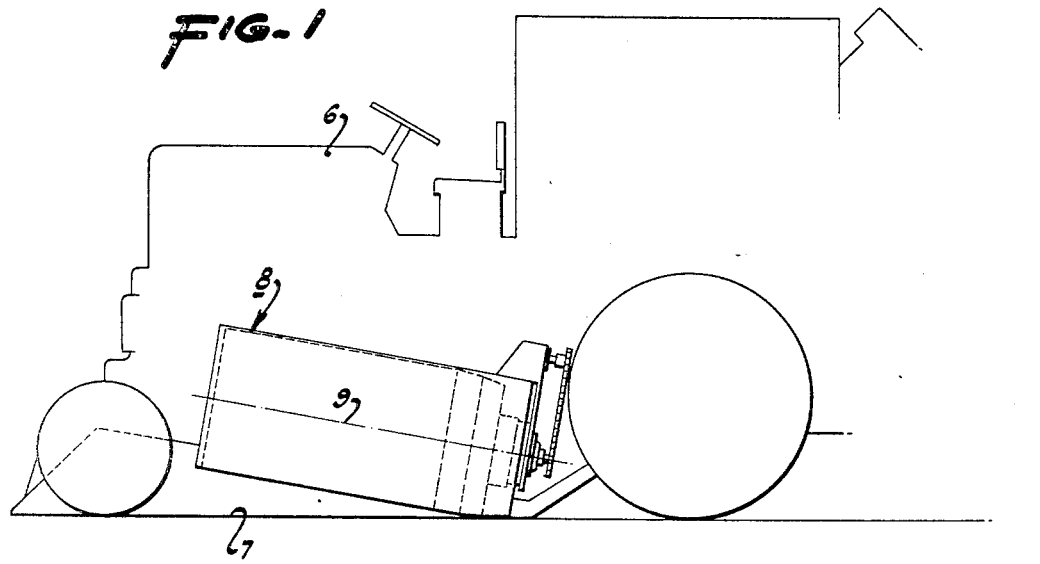
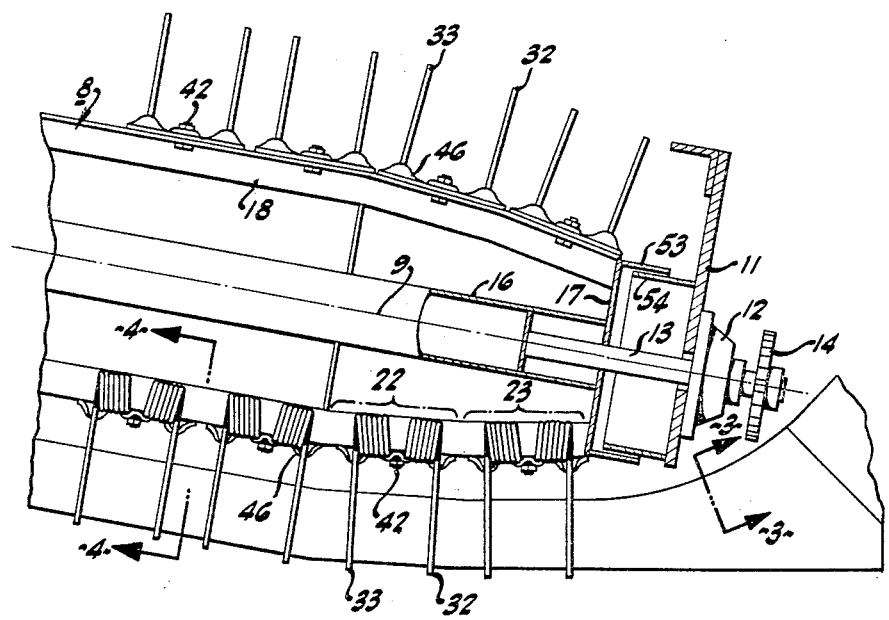
INVENTOR
GEORGE O. TIURA
BY Lothrop & West
ATTORNEYS

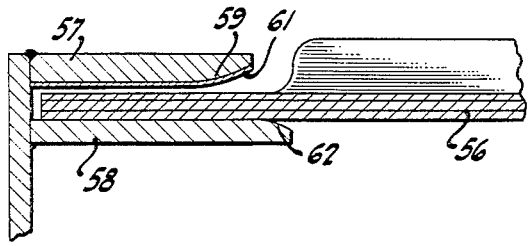
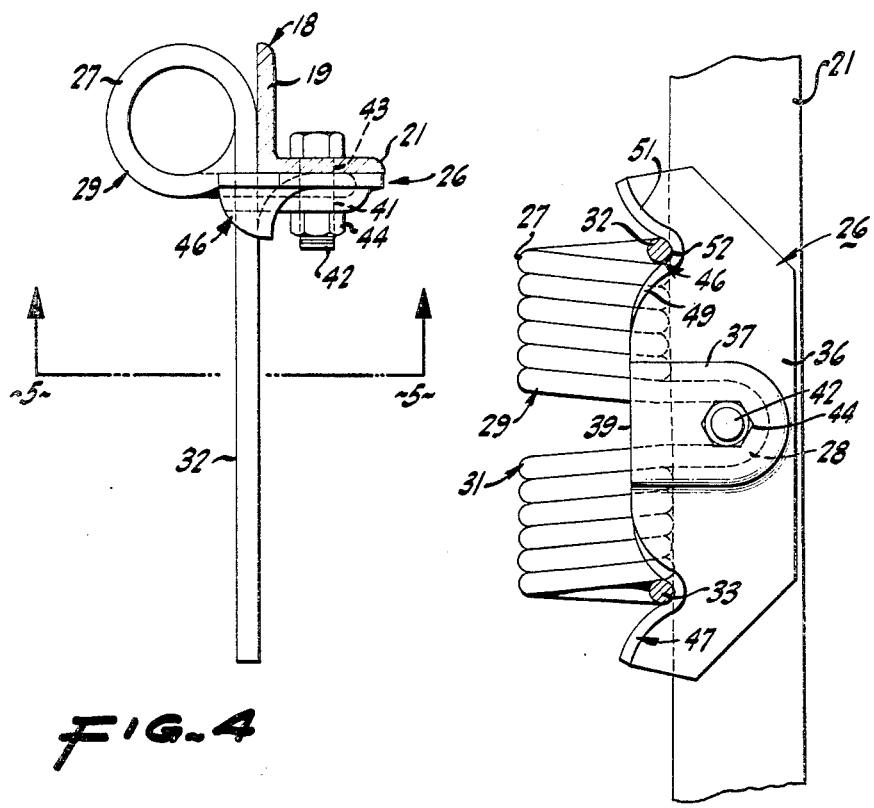

3,479,807
BEAN HARVESTER
George O. Tiura, Modesto, Calif., assignor to Tiura Manufacturer & Sales, a corporation of California
Filed Mar. 20, 1967, Ser. No. 624,380
Int. Cl. A01d 7/00
U.S. Cl. 56—400                                2 Claims

ABSTRACT OF THE DISCLOSURE

A harvester having a rotor on an advancing frame, the rotor having a support bar on which a spring tine unit is held by a retaining plate provided with a reentrant notch to guide and center a spring-urged tine into the apex of the notch. The ground end of the inclined rotor is multiple tapered and has a guard against vine entanglement.

---

My invention relates to bean harvesters of the general sort as illustrated, for example, in Patent 3,190,062 issued June 22, 1965 to Paulson et al. and Patent 3,282,036 issued Nov. 1, 1966 to Paulson et al. This class of bean harvester includes a vehicle for advancing in a field alongside rows of growing beans and for propelling rotors along the bean rows, the rotors having tines projecting therefrom for roving through the bean vines and dislodging the beans onto a conveyor extending from a point near the ground and alongside the rotors to another point for holding or processing the picked beans. While machines of this class are generally successful, certain difficulties have arisen in practical operation. It is desirable to deep picking of beans (sometimes two rows on one side at a time) to have tines long enough so that they can extend a substantial distance into the bean vines, well into vines planted in closely adjacent rows. There has been difficulty with considerable tine breakage, requiring shutting down of the machinery in the field and substantial emergency replacement of the tines. Sometimes the tines don't actually break but are bent out of position and so become ineffective and must be replaced. Additionally, there has been some difficulty with the tine spacing, particularly in the portion of the rotor or reels adjacent the ground, in that the path of the various tines sometimes omits a porion of the beans which might otherwise be recovered. There has been some difficulty with wrapping of the bean vines about portions of the rotary machinery, and severe wear has taken place in parts of the machine adjacent the ground.

It is therefore an object of the invention in general to provide an improved bean harvester.

Another object of the invention is to provide a tine arrangement effective to reduce breakage of tines and to extend the tine life.

Another object of the invention is to improve the tine positioning in portions of the machine adjacent the ground to obviate vine wrapping and to reduce wear in certain portions of the machine.

Other objects together with the foregoing are attained in the embodiment of the invention described in the accompanying description and illustrated in the accompanying drawings, in which:

FIGURE 1 is a schematic side elevation showing an outline of a typical bean harvester with the reel or rotor and adjacent portions of the machine in detail;

FIGURE 2 is a cross section on a vertical longitudinal plane through the rearward portion of the rotor mechanism of the bean harvester;

FIGURE 3 is a cross section to an enlarged scale of a portion of the conveyor belt and skow mechanism shown in FIGURE 2, the section being on the line 3—3 of FIGURE 2;

FIGURE 4 is a cross section to an enlarged scale, the plane of which is indicated by the lines 4—4 of FIGURE 2; and FIGURE 5 is a cross section of the structure shown in FIGURE 4, the plane of section being indicated by the line 5—5 of FIGURE 4.

The customary bean harvester is a structure including a carriage 6 adapted to be manually directed through a field 7 in which beans are growing. The carriage is symmetrical and along each side includes a rotor 8 or reel supported on the carriage with the rotational axis 9 of the rotor generally inclined so that its forward end is higher than its rearward end. The rotor 8 has appropriate bearing support at its forward end and at its rearward end is particularly supported by a plate 11 forming part of the framework of the carriage 6 and carrying a bearing 12 in which the driving shaft 13 of the rotor 8 is journalled. A sprocket 14 connected to the propulsion machinery produces rotation of the shaft 13 and concurrent rotation of a central reinforcing rotor tube 16 and of an end plate 17.

Pursuant to the invention, the rotor is inclusive of a number of longitudinally extending support bars 18. These are conveniently of angle shape as show particularly in FIGURE 4, having a flat flange 19 and a flat flange 21, the latter of which is substantially tangent to a circle centered on the axis 9. For most of its length the rotor is of a constant diameter, but adjacent its rearward end near the ground 7 the rotor is in effect curved or reduced in diameter in successive steps to diminish from its normal size to a much smaller size adjacent the plate 17. While the size reduction can be continuous, in practice it is desired to approximate a curve by providing several adjacent conical sections such as 22 and 23 (FIGURE 2). Each section is made up of a portion of the support bars 18 slightly angled with respect to the adjacent portions, so that the outer surfaces change only very slightly from one portion of the rotor to the next. This permits of only slight variation in axial tine spacing and angle and allows a gradually slower peripheral tine speed for ready vine disengagement near the ground.

At appropriate intervals along the length of each of the support bars 18, including the tapered portions 22 and 23, are spring tine units generally designated 26 (FIGURES 4 and 5). These units are all substantially identical so that a description of one applies equally to all of the others. Each of the units 26 includes a spring wire 27 usually, although not necessarily, of circular cross section. The units are symmetrical and provide a pair of tines but may be single if desired. Preferably, the central portion of the wire is formed to provide a U-shaped loop 28 of planar elevation arranged tangentially at the adjacent ends of a pair of coaxial helices 29 and 31 having a number of adjacent turns. At their remote ends the helices 29 and 31 extend tangentially, usually at approximately a right angle to the plane of the loop 28, to afford freestanding, approximately parallel tines 32 and 33 of somewhat more than the usual length.

The tine unit is held adjacent to and in fact is clamped against the flat flange 21 of the support bar 18 by means of an overlying plate 36. The plate has an offset central portion 37 upstanding from the general plane of the plate to afford a U-shaped pocket 39. The pocket is designed snugly to house and confine the loop 28. The plate has an opening 41 therein adapted to receive a bolt 42 passing through the bight of the loop 28 and extending through an opening 43 in the flange 21 of the support bar. A nut 44 on the bolt 42 clamps the parts tightly in position, usually with the tines 32 and 33 closely adjacent to the flange 19 of the support bar, although some space therebetween is permissible.

Particularly in accordance with the present invention, the plate 36 either side of the pocket 39 is provided with substantially similar configurations amounting to guides 46 and 47 for the pair of tines 32 and 33. The guides are notches formed by adjacent edge portions 49 and 51 of the plate turned inwardly and upwardly toward each other. The portions 49 and 51 merge centrally in a notch apex 52 of arcuate form substantially to accommodate the circular tine 32, for example. The sides of the notch converge gradually to terminate in an apex of considerable radial height. In the normal installation the tines are wound slightly when installed so that when each is seated in the apex of its notch it presses firmly against the adjacent surfaces. The upturned edges extend substantially above the plane of the plate 36 to lie alongside of the lower portion of and restrain the individual tines.

When the reel is in operation and the tines roll through the vines, they are displaced out of the notches in both circumferential and axial directions and the helices are wound considerably tighter. Because of the initial pressure of the tines against the notch walls, it requires more force to dislodge the tines during picking than it would if the tines were free standing. When the tines release from the vines after picking the beans, as the rotor revolves, the free tines are then spring-pressed toward the plate 36. During the picking operation, the tines are not only rotated in their general rotational plane, but likewise may be displaced axially either forwardly or rearwardly in very substantial amounts, depending upon the growing habits of the vines and the manner of picking of the beans. When the tines are freed from the vines, they do not necessarily always tend to return to the starting location. Also, in the absence of an arrangement as shown herein, the free tines tend to vibrate for a protracted period after they have been released from the vine.

With the present notched plate configuration, the tines when released are spring-returned toward the notches. In engaging the side portions 49 and 51, the tines if distorted or displaced axially are cammed toward a central position and are finally lodged at the apex of the notch. Thus the tines are restored to a correct initial position for subsequent picking and their configuration is restored to the original one. Also, promptly upon contact of the tines with the supporting walls in the notch, the vibrations of the spring mechanism are immediately damped out. Metal fatigue is greatly reduced. The tine wire is backed up or supported at a considerable distance from the shape change between the helical portion and the tangential tine so that any strains which might have originally been left in the metal during the forming operation are well resisted by the upstanding notch walls. It has been found in practice that very little breakage is experienced with this arrangement, and in fact in some machines an entire season has been experienced without tine breakage.

As the rotor advances over the vines, there is some tendency for the vines to wrap around the shaft 13. To avoid this, the plate 17 at the rearward portion of the rotor is provided with a collar 53 overlying a cup 54 outstanding from the plate 11. Since both the collar and the cup are smoothly circular, there is nothing exposed to engage or trap or wrap a vine about the rotary parts.

The discharged beans are caught on a central conveyor belt 56 (FIGURE 3) which operates between guide plates 57 and 58 at the sides of the carriage 6 and beneath the central portion thereof. To reduce wear on the belt 56, the upper guide plate 57 is preferably provided with a curved portion 59 covered with a hard surface 61. Correspondingly, the lower guide 58 likewise has a curved marginal portion 62.

What is claimed is:

1. A bean harvester comprising a frame, a rotor on said frame, means for mounting said rotor on said frame for rotation about a longitudinal axis, a support bar on said rotor, said bar having a longitudinal first wall substantially radial of said rotor and having a longitudinal second wall substantially normal to said first wall, a spring tine unit including a spring wire shaped to define a pair of coaxial oppositely wound helices at adjacent ends merging in a loop tangent to said helices and at opposite ends extending tangentially of said helices to provide a pair of tines in substantially the same plane, an apertured plate having a portion overhanging said first wall and having an offset central pocket adapted to receive said loop, means passing through said plate and said loop for securing said plate and said loop against said second wall with said pair of tines adjacent said first wall, and means in the overhanging portion of said plate on opposite sides of said pocket forming a pair of re-entrant edge portions defining notches each converging toward and terminating at an apex substantially in line with said first wall.

2. A bean harvester as in claim 1 in which said helices upon installation are in slightly wound condition with said pair of tines resiliently pressed against said edge portions at said apex.

References Cited

UNITED STATES PATENTS

| 2,302,541 | 11/1942 | Fuller | 56—400.17 |
| 2,714,796 | 8/1955 | Haupt et al. | 56—400 |
| 3,014,335 | 12/1961 | Nolt | 56—400 |
| 3,165,876 | 1/1965 | Towson | 56—130 |

ANTONIO F. GUIDA, Primary Examiner

U.S. Cl. X.R.

56—130